US005792817A

United States Patent [19]
Dobson

[11] Patent Number: 5,792,817
[45] Date of Patent: Aug. 11, 1998

[54] SURFACTANT

[75] Inventor: Derrick Clifford Dobson, Heywood, England

[73] Assignee: Imperial Chemical Industries PLC, London, England

[21] Appl. No.: 972,687

[22] Filed: Nov. 18, 1997

Related U.S. Application Data

[63] Continuation of Ser. No. 307,641, Nov. 30, 1994, abandoned.

[30] Foreign Application Priority Data

Mar. 16, 1992 [GB] United Kingdom ............. 9205701

[51] Int. Cl.$^6$ .................................................. C08F 8/14
[52] U.S. Cl. ........................... 525/327.7; 525/328.8; 525/328.9; 525/330.1; 525/384
[58] Field of Search ..................... 525/327.7, 328.8, 525/328.9, 330.1, 384

[56] References Cited

U.S. PATENT DOCUMENTS 3,360,339 12/1967 Schulz, Jr. .
4,389,213 6/1983 Schneider et al. .
4,734,204 3/1988 Lamb ........................ 525/327.7

FOREIGN PATENT DOCUMENTS

| 64225 | 11/1982 | European Pat. Off. . |
| 131558 | 1/1985 | European Pat. Off. . |
| 233684 | 8/1987 | European Pat. Off. . |
| 373621 | 6/1990 | European Pat. Off. . |
| 403197 | 12/1990 | European Pat. Off. . |
| 459651 | 12/1991 | European Pat. Off. . |

*Primary Examiner*—Bernard Lipman
*Attorney, Agent, or Firm*—Pillsbury Madison & Sutro LLP

[57] ABSTRACT

A surfactant characterised by a plurality of addition-copolymer chains, on each chain an average of at least 0.5 chemisorptive groups and at least one monovalent polyether residue; and between the chains at least one divalent polyether residue, a method of making it, a dispersion containing the surfactant and a dispersed solid, a polymer composition that comprises the surfactant and a plasticiser, a method for making the dispersion, a dispersible soild comprising the surfactant, and a product coated with material comrpising the discontinuous phase of the dispersion.

9 Claims, No Drawings

SURFACTANT

This is a continuation of application Ser. No. 08/307,641, filed on Nov. 30, 1994, which was abandoned upon the filing hereof Nov. 18, 1997.

This invention relates to a surfactant, a method of making it, a dispersion containing the surfactant and a dispersed solid, a polymer composition that comprises the surfactant and a plasticiser, a method for making the dispersion, a dispersible solid comprising the surfactant, and a product coated with material comprising the discontinuous phase of the dispersion.

According to a first aspect of the invention, a surfactant is characterized by a plurality of addition-copolymer chains, on each chain an average of at least 0.5 adsorptive or chemisorptive groups and at least one monovalent polyether residue; and between the chains at least one divalent polyether residue.

The terms "adsorptive" and "chemisorptive" herein indicate that the chains of the surfactant are capable of adsorption or chemisorption to the surface of a phase other than that which is or comprises the surfactant.

The balance of the relative proportions of the chains and the residue is such that the surfactant has sufficient solubility as such or as a salt in a liquid to exert surface activity, either in that liquid or on the surface of a solid to which it is applied by way of such a solution. Whereas it is believed that the surfactant is mainly a two-dimensional molecule, it may be at least partly three-dimensional, provided that it has sufficient solubility.

A particular embodiment of the surfactant of the present invention is characterised by the following features:

(a) a plurality n of addition-copolymer chains;

(b) on at least n–2 chains, at least one, especially 3–10, optionally salified carboxylic acid groups and at least two carboxylic ester groups;

(c) at least one, especially 2–6 of the carboxylic ester groups in each chain having as its alcohol residue a monovalent polyether residue; and (d) at least one other of the carboxylic ester groups in each chain having as its alcohol residue a divalent polyether residue, a further end of which is the alcohol residue of the carboxylic ester group of another of said addition-copolymer chains; and (e) optionally a carboxylic ester group having as its alcohol residue a monovalent hybrocarbyl residue, e.g. $C_{1-20}$ hydrocarbyl.

The addition-copolymer chains may consist of (i) carboxyl-carrying units present as acid or ester in features (b)–(d) and (ii) other units.

The carboxyl-carrying units may be for example (meth)acrylic units, but are preferably 1,2-dicarboxylic units such as maleic units. The number of such carboxyl groups per 100 addition-copolymerised monomer residues in their overall relative proportions is preferably in the range of 25 to 60, especially 45 to 55. The acid value of the addition-copolymer chains, assuming hydrolysis of any anhydride units is suitably in the range of 150–350, especially 250–310, mg KOH/g. The free carboxylic acid groups in each chain are optionally salified with for example a plurality of monovalent cations such as alkali metal, e.g. sodium, or ammonium ions.

The other units may for example comprise ethylene, vinyl esters, vinyl ethers or acrylic esters, but are most conveniently styrene.

The average molecular weight of each of the addition-copolymer chains is suitably in the range of 1000 to 5000, especially 1500 to 300.

The monovalent polyether residue is suitably derived from an ether-terminated polyalkylene glycol. Such polyalkylene glycol (apart from its terminating hydrocarbyloxy group) has an oxygen-to-carbon ratio preferably in the range of 0.25 to 0.33.

Its average molecular weight is preferably in the range of 250 to 5000, especially 300 to 400 including the terminating hydrocarbyloxy group.

That group is preferably $C_{1-4}$ (lower) alkyl or phenyl.

The divalent polyether residue is conveniently the same in oxygen-to-carbon ratio as the monovalent residue.

Its average molecular weight is preferably in the range of 150 to 1000, especially 150 to 300.

The invention provides in its second aspect a method of making the above particular embodiment of the surfactant of the present invention which is characterised inter alia by:

(i) a plurality of copolymer chains; and (ii) on at least n–2 chains, at least one carboxylic acid group, the method being characterised by:

(a) reacting an addition-copolymer comprising carboxyl-carrying monomer units in esterifying conditions with a monovalent polyether alcohol corresponding to the monovalent polyether group, to an extent leaving at least one esterifiable group on at least n–2 of the addition-copolymer chains; and (b) reacting the product of step (a) in esterifying conditions with a divalent polyether alcohol.

The term "esterifying" includes transesterifying and the term "esterifiable" includes transesterifiable.

In this method the addition-copolymer of carboxyl-carrying and other ethylenic monomers may be a commercially available addition-copolymer, such as SMA 3000A (Atochem UK Limited). Alternatively, the addition-copolymer may be prepared by the prior process step of copolymerising ethylenic monomers corresponding to the carboxyl-carrying and other monomers of the addition-copolymer chains. Conventional procedures using e.g. peroxide catalysts may be used.

The copolymerisation reaction is preferably controlled to give an average molecular weight of each of the addition-copolymer chains in the relevant above ranges.

In the method of the second aspect of the invention, both reaction steps may be carried out concurrently, but preferably step (a) is substantially completed before adding the divalent polyether alcohol.

In one variant of the latter sequential embodiment, in step (a), some of the carboxylic groups are left for esterification in step (b).

In an alternative, a great proportion or all of the carboxyl groups are reacted in step (a), and the divalent polyether alcohol reacts by transesterification in step (b).

The carboxyl-carrying monomer unit is preferably a 1,2-dicarboxylic unit such as maleic anhydride; in such case, esterification in step (a) (e.g. with or with a derivative of an ether-terminated polyalkylene glycol), and preferably also in step (b) is carried out by ring-opening.

The necessary control of the reaction is preferably effected by control of the proportions of the reactants.

As a result of the ring-opening and esterification only to the extent of leaving at least one esterifiable group on at least n–2 of the addition-copolymer chains, free carboxyl groups are made available.

These may be neutralised by alkali, e.g. sodium hydroxide or ammonia (e.g. at 20 to 100, typically 60° C. in the case of alkali) to increase solubility in water.

The relative proportions of the addition-copolymer, the monovalent polyether alcohol and the divalent polyether alcohol should be such as to (a) cross-link at least 50 mole percent of the addition-copolymer chains, but (b) suitably not give more than 10 of such chains per surfactant molecule, because of the resulting high viscosity.

The proportions are preferably in the following ranges defined by mole equivalent fractions of esterifiable carboxyl and alcoholic hydroxyl:

| carboxyl | 0.64–0.69 |
|---|---|
| hydroxyl in monovalent polyether alcohol | 0.27–0.35 |
| hydroxyl in divalent polyether alcohol | 0.01–0.07. |

Whether carried out concurrently or in any sequential embodiment of step (a) and step (b), both reaction steps are carried out at temperatures typically in the range of 140°–180° C.

A solvent, for example a hydrocarbon boiling in that range may be present, but it is usually preferred to carry it out in the melt.

One embodiment of the particular surfactant of the present invention is characterised by a carboxylic ester group having as its alcohol residue e.g. $C_{1-20}$ hybrocarbyl.

Such an ester group may be incorporated in the surfactant molecule by esterification or by use of a corresponding monomer in the production of the initial addition-copolymer.

The invention in a third aspect provides a dispersion in a liquid characterised by containing a dispersion-stabilising quantity of the surfactant.

Where the dispersion is characterised by containing a dispersion-stabilising quantity of the particular surfactant of the present invention, the dispersion may also contain a minor proportion of a material characterised by the following features:

(a) a plurality n of addition-copolymer chains;

(b) on at least n–2 chains, at least one, especially 3–10, optionally salified carboxyl acid groups and at least two carboxylic ester groups;

(c) at least one, especially 2–6 of the carboxylic ester groups in each chain having as its alcohol residue a monovalent polyether residue; and (d) optionally a carboxylic ester group having as its alcohol residue a monovalent hybrocarbyl residue, e.g. $C_{1-20}$ hydrocarbyl, i.e. an uncrosslinked form of the surfactant of the present invention, which may e.g. be present in the product of the present method for the particular embodiment of the surfactant of the present invention.

The material of the discontinuous phase of the dispersion is preferably an inorganic solid, especially a crystalline oxide or combination of oxides, particularly having at least on its surface, a combination of a volatile oxide and an involatile oxide.

Thus the material of the discontinuous phase of the dispersion is preferably an inorganic crystalline carbonate, basic carbonate or hydroxide. It preferably has a crystallographic face similar to the 001 face of calcite. The involatile oxide component of such material of the discontinuous phase of the dispersion is preferably at least as strong a base as magnesium oxide. Other oxides include those of aluminium, copper, zinc, vanadium, chromium, manganese, iron, cobalt and nickel and compounds which include mixtures thereof, such as clays, spinel precursors and malachites.

The dispersion is especially suitable for solid particles of high aspect ratio, for example 5:1 to 50:1.

For optimal stability against flocculation and for low viscosity, where the material of the discontinuous phase of the dispersion is a crystalline solid, the distance between the carboxyl groups of the surfactant is chosen to match the crystallographic lattice parameters of the dispersed material.

Thus, for example for the calcite lattice, the carboxyl groups in the addition-copolymer chains, are suitably separated by 4 ethylene oxide residues. It is believed that the surfactant is then substantially completely adsorbed on the dispersed phase, thereby leading to an acceptable charge density at the surface, tending to act against flocculation and for low viscosity. If the number of carboxyl groups per unit length of the surfactant molecule chains were too great, the surfactant would not be uniformly and completely adsorbed.

It is believed that, depending on the nature of the dispersed phase, the adsorption may actually be chemisorptive in nature.

However the nature of the interaction between the chains and the solid is not in any way relevant to or limiting on any aspect of the present invention.

The liquid forming the continuous phase of the dispersion typically is or comprises water, but may be or comprise a highly polar organic liquid. The dispersion may comprise other ingredients, such as pigments, texturising agents, perfumes and disinfectants, and other surfactants and polymers.

A preferred dispersion has a high solids content of 20–80% w/w, especially 25–75% w/w.

Even at such a high solids content, the dispersion may typically have a relatively low viscosity, and its rheological properties may be adjusted with considerable freedom by means of additives. In particular the dispersion of the present invention may have any rheology between mobile and thixotropic using additives.

The dispersion is suitable for coating solid substrate surfaces with the dispersed solid.

For example, a dispersion comprising fine particles is especially suitable as a printing ink of low viscosity with good stability against flocculation, e.g. for wallpapers, or for applying surface fire-proofing or making abrasive papers.

If desired, the dispersion may be caused or allowed to settle and the precipitate may be collected and dried. The dried material may, optionally after milling, be redispersed. The material may be redispersed in an organic medium, especially a plasticised polymer.

The invention accordingly provides in its fourth aspect a composition, characterised in that it comprises a polymer containing a plasticiser and a solid dispersed material having a surfactant of the present invention adsorbed on its surface.

The polymer is especially polyvinyl chloride or a copolymer of vinyl chloride, and the plasticiser is especially a dialkyl phthalate, e.g. dioctyl phthalate.

The invention in a fifth aspect provides a method for making a dispersion according to the third aspect, characterised by incorporating with the solid a quantity of a surfactant of the present invention to adsorb onto the surface of the solid to an extent which is sufficient to stabilise a dispersion of the solid in the liquid.

Typically this is a quantity such as to adsorb onto at least half of the relevant adsorptive sites on the surface.

Incorporation of the surfactant of the present invention to adsorb onto the surface of the solid may be carried out for example by simple mixing of the surfactant of the present invention with the solid which has been pre-comminuted by wet- or dry-grinding;

by size reduction of the solid in the presence of the surfactant;

by (co)precipitation of the solid in the presence of the surfactant; or by digestion in the presence of the surfactant of a solid previously (co)precipitated in the absence of the surfactant and/or in the presence of another surfactant.

In each such method, incorporation of the surfactant of the present invention may include intensive mixing with the solid, for example homogenisation under high shear to break down secondary aggregates of the solid and/or to effect further comminution.

If the surfactant of the present invention is in the form of a salt, and the nature of the interaction between the surfactant and the solid is chemisorptive, it may be desirable to include pH adjustment in the incorporation method to neutralise alkali or ammonia liberated by chemisorption of carboxylic acid groups to the solid surface.

The invention in its sixth aspect provides a redispersible solid comprising fine particles having a surfactant of the present invention adsorbed or chemisorbed on its surface.

The surfactant will be adsorbed in a quantity which is sufficient to stabilise a dispersion of the solid in a liquid, preferably sufficient to adsorb or chemisorb onto at least half of the relevant adsorptive or chemisorptive sites on the surface.

The redispersible solid is are most conveniently made by drying the dispersion of the third aspect of the invention, but may be made by dry-mixing or melt-mixing of the solid with the surfactant.

The invention in a seventh aspect provides a method of coating a substrate with the discontinuous phase of a dispersion of the third aspect of the invention, which comprises applying the dispersion to the substrate.

Any convenient method may be used, for example intaglio printing, padding, brushing, spraying, doctoring and reverse-roll coating.

The process may include preliminary adjustment of the rheology of the dispersion using additives. The liquid forming the continuous phase of the dispersion typically is removed during the coating process e.g. by evaporation.

The dispersion is especially suitable for roller-coating paper at a shear rate of less than 1 sec$^{-1}$.

The invention accordingly provides in its eighth aspect a product coated with material comprising the discontinuous phase of the dispersion of the third aspect of the invention.

Examples of such products include in particular printed papers, e.g. wallpapers, fire-proofed papers and abrasive papers.

The present invention is illustrated by the following Example.

EXAMPLE (a) Preparation of the surfactant

The following reactants were used:

styrene maleic anhydride addition-copolymer (SMA) (molar ratio 3:1) of molecular weight 1900, commercially available as SMA 3000A (Atochem UK Limited);

methoxy polyethylene glycol (MeOPEG), molecular weight 350; and polyethylene glycol (PEG), molecular weight 250.

The latter two reactants were dried before use by heating under vacuum.

Under a nitrogen blanket and continuing nitrogen flow, SMA (1421.4 g, 0.748 mole) and MeOPEG (995 g, 2.843 mole) were melted together and held at 160°–165° C. for 1.5 h., to effect ring-opening and esterification of the maleic anhydride units in step (a) of the present method. The mixture was cooled to below 125° C. PEG (49.53 g, 0.2447 mole) was added and stirred in for 5 to 10 min. The whole mixture was heated to 175° C. and held there for 30 to 60 min., to effect further esterification of (ring-opened) maleic anhydride units and cross-linking between the chains of the SMA addition-copolymer in step (b) of the present method.

The mixture remained liquid and of stable viscosity. The product was cooled to 120° C. and poured out.

A sample was dissolved over several hours in dilute sodium hydroxide at 60° C. to give a solution of salified surfactant of final pH of 7.5 to 8.5.

This surfactant is referred to as "B" below.

The same procedure was used with with adjusted quantities of the same reactants to give the surfactant referred to as "A" below. The two surfactants are summarised and compared thus:

|  | Mole ratio | | | | Esterifible Groups ratio % | |
|---|---|---|---|---|---|---|
|  | SMA | MeOPEG | PEG | CO$_2$H | OH in MeOPEG | OH in PEG |
| Surfactant A | 1 | 3.8 | 0.473 | 0.661 | 0.271 | 0.068 |
| Surfactant B | 1 | 3.8 | 0.331 | 0.675 | 0.277 | 0.048 |

(b) Preparation of dispersion of solids in water

The following aqueous slurries I and II were made up using 100 g solids in aqueous solutions of surfactants made according to (a) above:

"Ultracarb", 30% w/w solids content (RTM, commercially available from Microfine Ltd, a naturally occurring crystalline mineral composed of approximately equal amounts of huntite and hydromagnesite with a lamellar crystal habit with an aspect ratio in the range of 5:1 to 20:1 which consequently forms aqueous slurries of high viscosity) with Surfactant A, 1.5% w/w on Ultracarb.

"Calopake F", 46.8% w/w solids content (commercially available from Rhone-Poulenc, a precipitated calcium carbonate of particle size 2.1 µu Stokes equivalent diameter) with Surfactant B, 1.5% w/w on Calopake F.

Addition was made stirring at first at 250 rpm, increasing to 500 rpm, as the viscosity rose; the product was stirred for a further 10 min.

The dispersion was then stored at room temperature for up to 6 days. The viscosity was measured at intervals using a Brookfield viscometer at two rpm levels.

Control samples with respect to slurry I of dispersions at the same total solids content, using no surfactant and using each of the following known surfactants were also prepared and tested by the same procedures:

| SMA 3000A | styrene maleic anhydride addition-copolymer sodium salt surfactant, Atochem UK Limited; |
|---|---|
| Polysalt S | polycarboxylic acid sodium salt, BASF; |
| Coptal WA-OSN | sodium dioctyl sulphosuccinate, hexylene glycol and ethylene glycol, ICI PATCO; |

Comparison samples with respect to slurry I at similar total solids content, using no surfactant and using various quantities of each of the following were also prepared and tested:

Dispex N40 water-soluble polyacrylate, 0.65% w/w on water.

Coptal WA-OSN 0.8% w/w on water.

Results are set out in Tables 1 and 2 below

TABLE I

Brookfield viscosities cP of Ultracarb slurries

| Surfactant | rpm | Days Storage | | | | | |
|---|---|---|---|---|---|---|---|
| | | 1 | 2 | 3 | 4 | 5 | 6 |
| SMA 3000A | 5 | 25000 | | | | | |
| Polysalt S | 5 | 11840 | 11920 | 12720 | 12800 | — | |
| | 100 | 1209 | 1218 | 1210 | 1230 | — | |
| Coptal WA-OSN | 5 | 13850 | 13602 | 14520 | 13600 | — | |
| | 100 | 1668 | 1781 | 1740 | 1720 | — | |
| I | 5 | 2520 | 2374 | 2420 | 2522 | — | |
| | 100 | 460 | 540 | 486 | 478 | — | |

All slurries 30% w/w solids content.

TABLE 2

Brookfield viscosities cP of Ultracarb slurries

| Surfactant | solids content | rpm | Days Storage | | | |
|---|---|---|---|---|---|---|
| | | | 1 | 2 | 5 | 6 |
| Dispex N40 | 53.5 | 5 | too thick to measure | | | |
| | | 100 | too thick to measure | | | |
| Coptal WA-OSN | | 5 | too thick to measure | | | |
| | | 100 | too thick to measure | | | |
| I | | 5 | 68 | 72 | 74 | 76 |
| | | 100 | 141 | 141 | 159 | 100 |

(c) Preparation of pigmented polymer

Precipitated calcium carbonate of particle size 4.5 μ was aqueous slurried at a solids content of 14.9% w/w and heated with agitation to 85° C.

Sufficient of an 18% w/w solution of surfactant B to give 2.6% w/w surfactant on the calcium carbonate dispersed phase, was heated to 75°–80° C. and added to the slurry with stirring.

Stirring was continued at 85° C. for 30 min. The product solid was collected on a filter, dried at 105° C. for 24 h, and milled using a pin disc mill.

A control sample was made by applying 1.6% w/w of stearic acid to the precipitated calcium carbonate by slurrying in ammonium stearate solution, then filtering, drying and milling in the same way.

All the samples of treated calcium carbonate were tested as fillers in PVC/dioctyl phthalate and PVC plastisol formulations, as follows.

A PVC masterbatch was prepared from:

| Corvic P706 emulsion PVC (ICI) | 406 G |
|---|---|
| Vinnol C8/62V paste extender copolymer containing 8% vinyl acetate (Wacker) | 280 g |
| Tribasic lead sulphate | 28 g |
| Polycarb S (uncoated ground calcium carbonate, 80% < 2μ, ECC) | 208 g |
| Diisononyl phthalate | 1120 g | using a Hobart mixer.

The formulations were prepared by mixing and then triple roller-milling the following:

| PVC masterbatch | 304 g |
|---|---|
| Calcium oxide | 4.8 g |
| Calcium carbonate treated as above | 75 g |
| Estibond 262 polyamino adhesion promoter, AKZO | 5 g |

The rheological properties of these formulations were measured using a Carri-Med rheometer in controlled stress mode. The measuring system was a 4 cm parallel plate with a 200 μ gap.

A linked flow/creep shear stress programme was used with the following parameters:

(a) 0–2000 Pa shear stress sweep over 40 sec. followed immediately by (b) creep curve at 40 Pa for 2 min.

Each sample was run 3 times with satisfactory reproducibility.

Daniel gauge measurements were carried out to assess slump.

The PVC/dioctyl phthalate formulation using surfactant B was found to have good flow properties in paste creep tests.

This gave a constant strain of 0.037 sec$^{-1}$ after 20 sec., compared with 0.10 sec$^{-1}$ after 20 sec. for the control formulation using stearic acid.

The PVC plastisol formulation using surfactant B gave a Daniel gauge measurement of 1 mm compared with 9 mm for the control formulation using stearic acid.

In the paste creep tests, it gave a value of about 0.5 sec$^{-1}$ after 10 sec., compared with about 1 sec$^{-1}$ after 10 sec. for the control formulation using stearic acid.

Its apparent viscosity at a shear stress of 2000 Pa was 5.30 Pa.s, compared with 4.76 Pa.s for the control formulation using stearic acid.

I claim:

1. A surfactant characterized by:

a) a plurality n of addition polymerization chains in which the proportion of carboxyl groups or residues is from 25 to 60 groups per 100 addition co-polymerized monomer residues;

b) on each chain an average of at least 0.5 optionally salified carboxylic acid groups and on at least n–2 chains, at least one optionally salified carboxylic acid group and at least two carboxylic ester groups;

c) at least one of the carboxylic ester groups in each chain having as its alcohol residue a monovalent polyether residue; and d) at least one other of the carboxylic ester groups in each chain having as its alcohol residue a divalent polyether residue, a further end of which is the alcohol residue of another of said addition polymer chains; and e) optionally a carboxylic ester group having as its alcohol residue a monovalent hydrocarbyl residue.

2. A surfactant as claimed in claim 1 in which the addition polymerization chains are constituted of maleic and/or (meth)acrylic residues in combination with residues of monomers selected from ethylene, vinyl esters, vinyl ethers, acrylic esters or styrene.

3. A surfactant according to claim 1, characterised by (a) on at least n–2 chains, 3–10 optionally salified carboxylic acid groups and at least two carboxylic ester groups;

(b) each of 2–6 of the carboxylic ester groups in each chain having as its alcohol residue a monovalent polyether residue; and (c) optionally a carboxylic ester group having as its alcohol residue a $C_{1-20}$ hydrocarbyl group.

4. A method of making the surfactant according to claim 1, characterised by:
  (a) reacting an addition-copolymer comprising carboxyl-carrying monomer units in esterifying conditions with a monovalent polyether alcohol corresponding to the monovalent polyether group, to an extent leaving at least one esterifiable group on at least n–2 of the addition-copolymer chains; and
  (b) reacting the product of step (c) in esterifying conditions with a divalent polyether alcohol.

5. A surfactant as claimed in claim 2 in which the addition polymerization chains are styrene maleic acid and/or anhydride copolymeric chains.

6. A surfactant as claimed in claim 2 or claim 5 in which the addition polymerization chains have an average molecular weight of from about 1000 to about 5000.

7. A method according to claim 4 wherein the addition polymerization chains are constituted of maleic and/or (meth)acrylic residues in combination with residues of monomers selected from ethylene, vinyl esters, vinyl ethers, acrylic esters or styrene.

8. A method according to claim 7 wherein the addition polymerization chains are styrene maleic acid and/or anhydride copolymeric chains.

9. A method according to claim 7 or 8 wherein the addition polymerization chains have an average molecular weight of from about 1000 to about 5000.

* * * * *